(12) United States Patent
Roberts

(10) Patent No.: US 7,357,693 B1
(45) Date of Patent: Apr. 15, 2008

(54) NOVELTY WHISTLE

(76) Inventor: Erik E. Roberts, 11410 Walpole Ct., Bowie, MD (US) 20720

( * ) Notice: Subject to any disclaimer, the term of this patent is extended or adjusted under 35 U.S.C. 154(b) by 84 days.

(21) Appl. No.: 11/340,770

(22) Filed: Jan. 27, 2006

(51) Int. Cl.
*A63H 5/00* (2006.01)
(52) U.S. Cl. ...................................... 446/216; 446/204
(58) Field of Classification Search ................ 446/204, 446/207, 209, 213, 216, 397, 404
See application file for complete search history.

(56) References Cited

U.S. PATENT DOCUMENTS

| | | | |
|---|---|---|---|
| 2,437,024 A * | 3/1948 | Grant, Jr. ..................... | 446/204 |
| 2,503,818 A * | 4/1950 | Grant, Jr. ..................... | 446/300 |
| D178,485 S | 8/1956 | Bacon | |
| 2,969,611 A | 1/1961 | Warren, Jr. | |
| 3,683,113 A | 8/1972 | Stewart | |
| 4,314,423 A | 2/1982 | Lipsitz et al. | |
| 4,737,130 A * | 4/1988 | Mann .......................... | 446/207 |
| 4,950,201 A * | 8/1990 | Sceery ........................ | 446/207 |
| 5,234,368 A * | 8/1993 | Carraway ................... | 446/202 |
| 5,648,753 A | 7/1997 | Martin | |
| 5,674,076 A * | 10/1997 | Billings et al. ............. | 434/365 |
| 6,250,247 B1 | 6/2001 | Chu | |
| 6,386,938 B1 * | 5/2002 | Novak et al. ............... | 446/186 |
| 6,435,933 B1 * | 8/2002 | Browne ....................... | 446/207 |
| 6,527,614 B1 * | 3/2003 | Primos ........................ | 446/207 |
| 6,575,804 B1 | 6/2003 | Primos | |

\* cited by examiner

*Primary Examiner*—John A. Ricci

(57) ABSTRACT

A novelty whistle for generating a sound of an animal includes a housing configured to have air blown therethrough. The housing includes a peripheral wall defining an interior space of the housing. The peripheral wall includes a front portion being substantially shaped like a head of an animal. A sound generation assembly is coupled to the housing and positioned in the interior space of the housing. The sound generation assembly produces the animal sounds when the housing is blown into.

14 Claims, 3 Drawing Sheets

NOVELTY WHISTLE

BACKGROUND OF THE INVENTION

1. Field of the Invention

The present invention relates to game calls and sound producing devices and more particularly pertains to a new game call for generating a sound of an animal.

2. Description of the Prior Art

The use of game calls is known in the prior art. U.S. Pat. No. 6,575,804 describes a device for producing a sound of a game animal by use of a reed vibrated by passing air through a whistle to attract the game animal. Another type of game call is U.S. Pat. No. 3,683,113 for electrically producing an animal sound that mimics the animals alarm call to scare the animals away from an area. Another type of game call is U.S. Pat. No. 6,250,247 for providing a plurality of pieces that are assembled to produce a spherical whistle.

While these devices fulfill their respective, particular objectives and requirements, the need remains for a device that has certain improved features that can produce sounds like an animal represented and has an appearance that is representative of the animal while responding to air being blown through an air passage to simulate the typical action of using a whistle.

SUMMARY OF THE INVENTION

The present invention meets the needs presented above by generally comprising a housing configured to have air blown therethrough. The housing includes a peripheral wall defining an interior space of the housing. The peripheral wall includes a front portion being substantially shaped like a head of an animal. A sound generation assembly is coupled to the housing and positioned in the interior space of the housing. The sound generation assembly produces the animal sounds when the housing is blown into.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
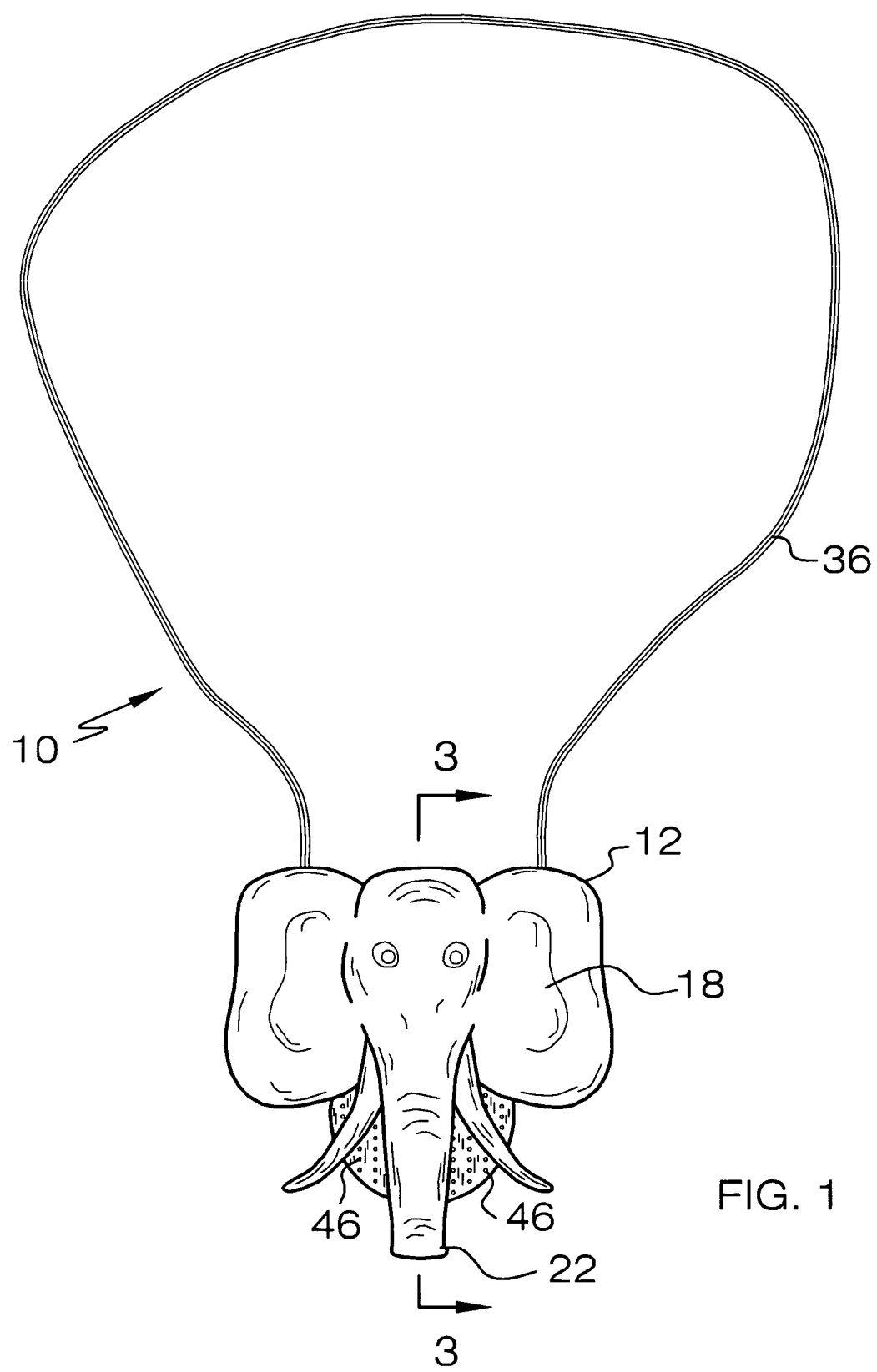
FIG. 1 is a front view of a novelty whistle according to the present invention.
Figure 2:
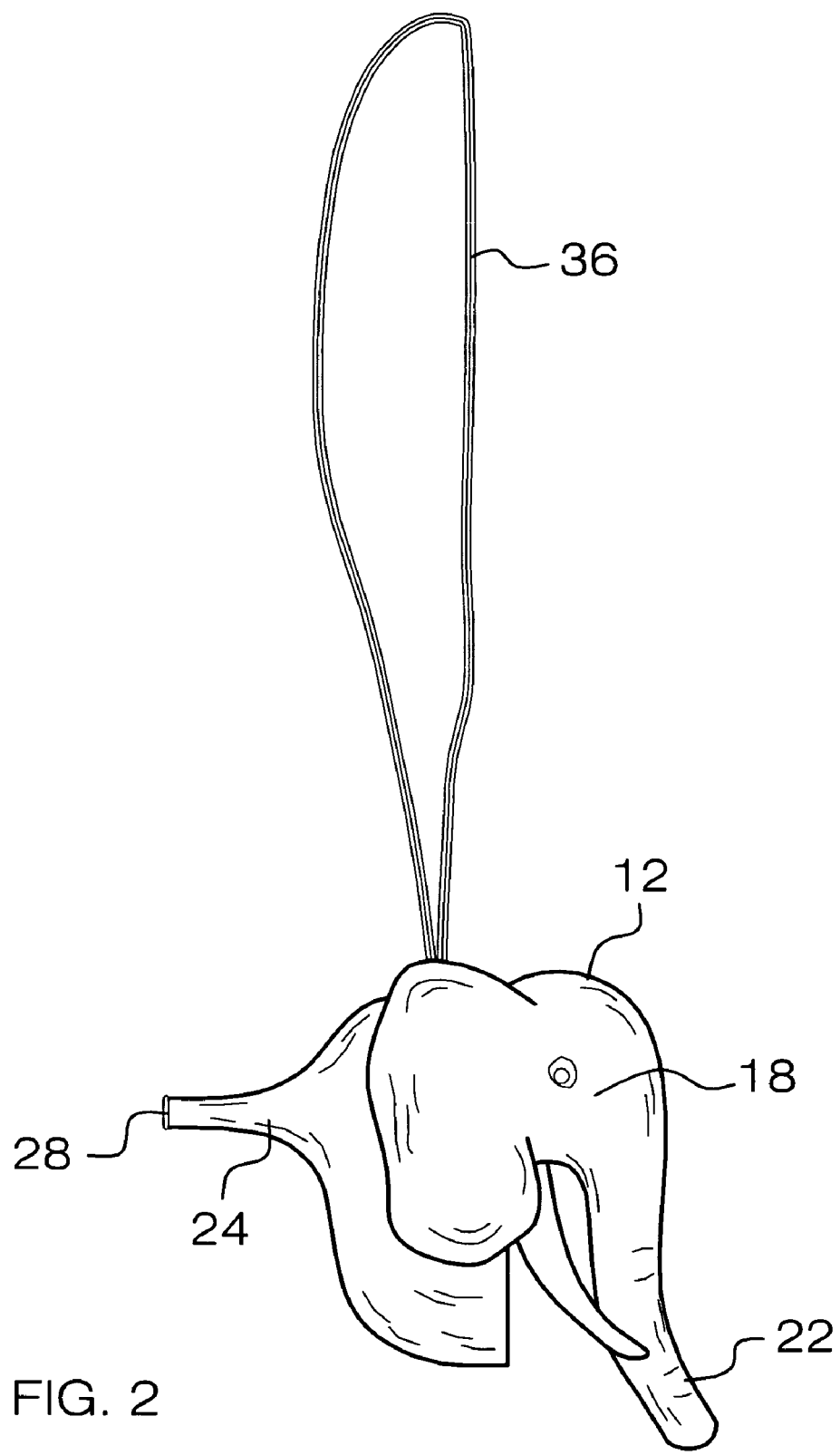
FIG. 2 is a side view of the present invention.
Figure 3:
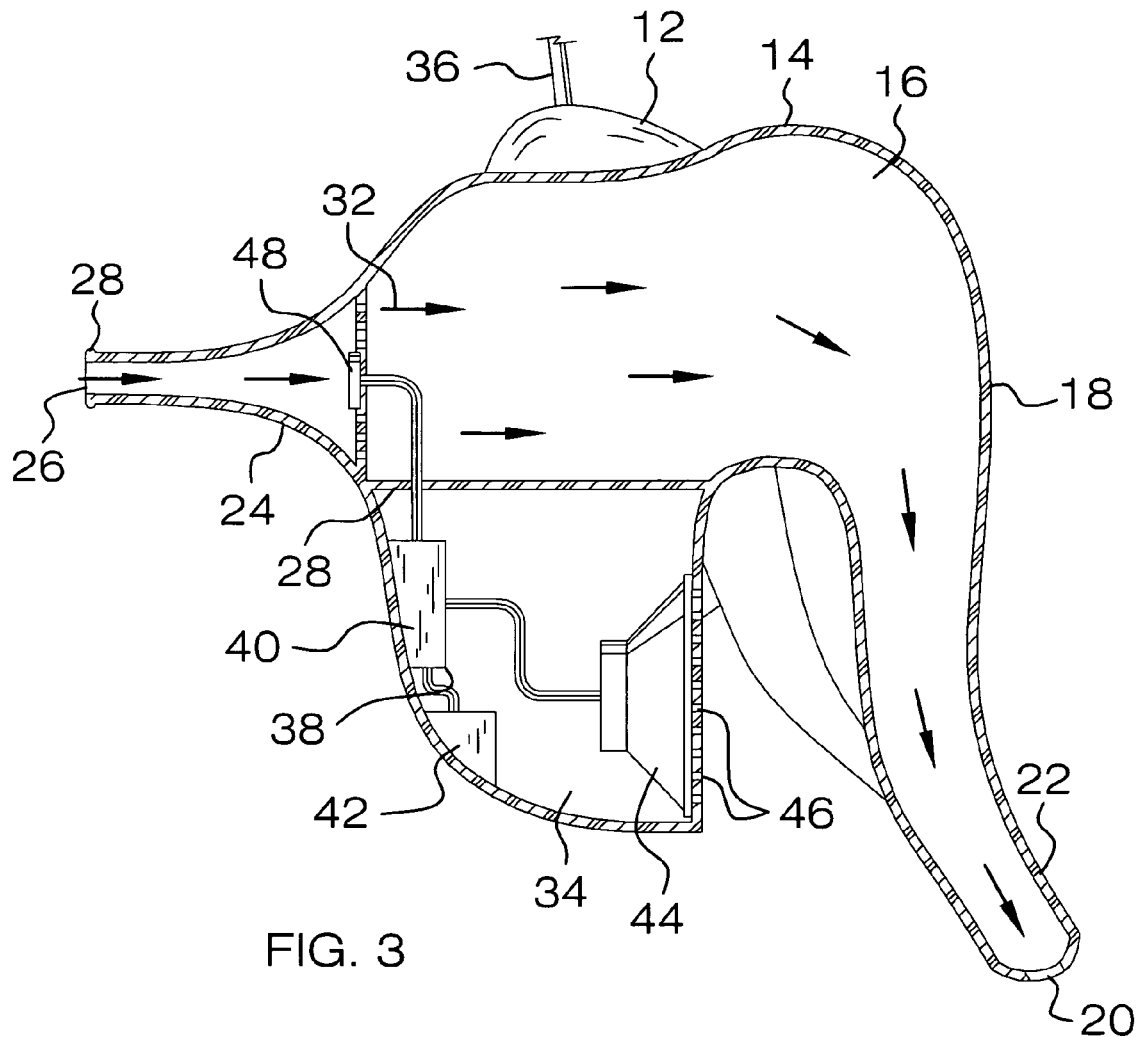
FIG. 3 is a cross-sectional view of the present invention taken along line 3-3 of FIG. 1.
Figure 4:
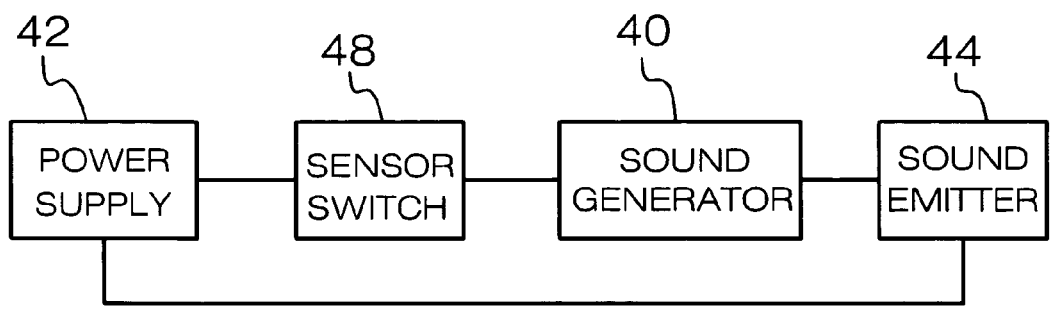
FIG. 4 is a schematic view of the sound generation assembly of the present invention.

With reference now to the drawings, and in particular to FIGS. 1 through 4 thereof, a new game call embodying the principles and concepts of the present invention and generally designated by the reference numeral 10 will be described.

As best illustrated in FIGS. 1 through 4, the novelty whistle 10 generally comprises a housing 12 configured to have air blown therethrough. The housing 12 includes a peripheral wall 14 defining an interior space 16 of the housing 12. The peripheral wall 14 includes a front portion 18 being substantially shaped like a head of an animal. The front portion 18 has a front aperture 20 therein being positioned adjacent a nose 22 of the head of the animal. The peripheral wall 14 includes a rear portion 24 being substantially frusto-conical shaped and extending away from the front portion 18. The peripheral wall 14 has a rear aperture 26 therein positioned in a free end 28 of the rear portion 24 positioned opposite the front portion 18. The rear aperture 26 allows air to be blown into the interior space 16 and the front aperture 20 allows air blown into the interior space 16 to exit the interior space 16.

The housing 12 additionally includes a divider wall 30 coupled to the peripheral wall 14 and positioned in the interior space 16. The divider wall 30 divides the interior space 16 into an air passage 32 and a component space 34. The air passage 32 is in fluid communication with the open rear end and the open front end. A lanyard 36 is coupled to the housing 12 and forms a loop. The lanyard 36 is positionable around a portion of a person's neck to allow the housing 12 to be suspended from the neck.

A sound generation assembly 38 is coupled to the housing 12 and is positioned in the interior space 16 of the housing 12. The sound generation assembly 38 produces the animal sounds when the housing 12 is blown into. The sound generation assembly 38 includes a sound generator 40 being positioned in the component space 34 of the housing 12. The sound generator 40 generates sound signals when the sound generator 40 is turned on. The sound signals include animal sounds corresponding to an animal represented by the head. A power supply 42 is positioned in the component space 34 and is in electrical communication with the sound generator 40. The power supply 42 supplies power to the sound generator 40.

The sound generation assembly additionally includes a sound emitter 44 being positioned in the component space 34. The sound emitter 44 is in electrical communication with the sound generator 40 and receives the sound signals from the sound emitter 44 when the sound generator 40 is turned on. The sound emitter 44 generates audible tones characteristic of the animal sounds from the sound signals. The sound emitter 44 is directed toward the front portion 18. The front portion 18 has a plurality of openings 46 therein positioned adjacent to the sound emitter 44.

Additionally, the sound generation assembly 38 includes a sensor switch 48 being in electrical communication with the sound generator 40. The sensor switch 48 is in fluid communication with the air passage 32 to detect changes in air flow characteristics in the air passage 32. The sensor switch 48 turns the sound generator 40 on when the sensor switch 48 detects an increase in air flow characteristics in the air passage 32 indicative of the housing 12 being blown into. The sensor switch 48 can detect either an increase in air pressure or an increase of air flow passing through the air passage 32. The sensor switch 48 turns the sound generator 40 off when the sensor switch 48 senses a lack of air flow characteristics in the air passage 32 indicative of a lack of air flow in the air passage 32.

In use, the rear portion 24 is placed into the mouth and air is blown into the rear aperture 26. The sensor switch 48 detects the increase in flow characteristics through the air passage 32 and turns on the sound generator 40. The sound generator 40 generates sound signals to the sound emitter 44 which emits audible tones characteristic of the animal depicted by the front portion 18 of the housing 12. In the present case, the housing 12 resembles an elephant and the sound generating assembly 32 would preferably be configure to emit the sounds that an elephant would commonly make.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A novelty whistle for producing animal sounds, said whistle comprising:
    a housing configured to having air blown therethrough, said housing including a peripheral wall defining an interior space of said housing, said peripheral wall including a front portion being substantially shaped like a head of an animal, said front portion having a front aperture therein being positioned adjacent a nose of the head of the animal, said peripheral wall including a rear portion being substantially frusto-conical shaped and extending away from said front portion, said peripheral wall having a rear aperture therein positioned in a free end of said rear portion positioned opposite said front portion, wherein said rear aperture allows air to be blown into said interior space and said front aperture allows air blown into said interior space to exit said interior space, a divider wall being coupled to said peripheral wall and positioned in said interior space, said divider wall dividing said interior space into an air passage and a component space, said air passage being in fluid communication with said rear aperture and said front aperture; and
    a sound generation assembly being coupled to said housing and positioned in said interior space of said housing, said sound generation assembly producing the animal sounds when said housing is blown into, a portion of said sound generation assembly being positioned in said component space.

2. The whistle according to claim 1, wherein said sound generation assembly includes a sound generator being positioned in said interior space of said housing, said sound generator generating sound signals when said sound generator is turned on, said sound signals including animal sounds corresponding to an animal represented by said head.

3. The whistle according to claim 2, wherein said sound generation assembly includes a power supply being positioned in said interior space and being in electrical communication with said sound generator, said power supply supplying power to said sound generator.

4. The whistle according to claim 2, wherein said sound generation assembly includes a sensor switch being in electrical communication with said sound generator, said sensor switch being in fluid communication with said interior space to detect changes in air flow characteristics in said interior space, said sensor switch turning said sound generator on when said sensor switch detects an increase in air flow characteristics in said air passage indicative of said housing being blown into, said sensor switch turning said sound generator off when said sensor switch senses a lack of air flow characteristics in said air passage indicative of a lack of air flow in said air passage.

5. The whistle according to claim 2, wherein said sound generation assembly includes a sound emitter being positioned in said interior space, said sound emitter being in electrical communication with said sound generator and receiving the sound signals from said sound emitter, said sound emitter generating audible tones characteristic of the animal sounds from the sound signals, said sound emitter being directed toward said front portion, said front portion having a plurality of openings therein positioned adjacent to said sound emitter.

6. The whistle according to claim 1, further comprising a lanyard being coupled to said housing and forming a loop, said lanyard being positionable around a portion of a person's neck to allow said housing to be suspended from the neck.

7. A novelty whistle for producing animal sounds, said whistle comprising:
    a housing configured to having air blown therethrough, said housing comprising:
        a peripheral wall defining an interior space of said housing, said peripheral wall including a front portion being substantially shaped like a head of an animal, said front portion having a front aperture therein being positioned adjacent a nose of the head of the animal, said peripheral wall including a rear portion being substantially frusto-conical shaped and extending away from said front portion, said peripheral wall having a rear aperture therein positioned in a free end of said rear portion positioned opposite said front portion, wherein said rear aperture allows air to be blown into said interior space and said front aperture allows air blown into said interior space to exit said interior space;
        a divider wall being coupled to said peripheral wall and positioned in said interior space, said divider wall dividing said interior space into an air passage and a component space, said air passage being in fluid communication with said open rear end and said open front end;
    a sound generation assembly being coupled to said housing and positioned in said interior space of said housing, said sound generation assembly producing the animal sounds when said housing is blown into, said sound generation assembly comprising;
        a sound generator being positioned in said component space of said housing, said sound generator generating sound signals when said sound generator is turned on, said sound signals including animal sounds corresponding to an animal represented by said head;
        a power supply being positioned in said component space and being in electrical communication with said sound generator, said power supply supplying power to said sound generator;
        a sensor switch being in electrical communication with said sound generator, said sensor switch being in fluid communication with said air passage to detect changes in air flow characteristics in said air passage, said sensor switch turning said sound generator on when said sensor switch detects an increase in air flow characteristics in said air passage indicative of said housing being blown into, said sensor switch turning said sound generator off when said sensor switch senses a lack of air flow characteristics in said air passage indicative of a lack of air flow in said air passage;

a sound emitter being positioned in said component space, said sound emitter being in electrical communication with said sound generator and receiving the sound signals from said sound emitter, said sound emitter generating audible tones characteristic of the animal sounds from the sound signals, said sound emitter being directed toward said front portion, said front portion having a plurality of openings therein positioned adjacent to said sound emitter; and a lanyard being coupled to said housing and forming a loop, said lanyard being positionable around a portion of a person's neck to allow said housing to be suspended from the neck.

8. A novelty whistle for producing animal sounds, said whistle comprising:

a housing configured to having air blown therethrough, said housing including a peripheral wall defining an interior space of said housing, said peripheral wall including a front portion being substantially shaped like a head of an animal; and a sound generation assembly being coupled to said housing and positioned in said interior space of said housing, said sound generation assembly producing the animal sounds when said housing is blown into, said sound generation assembly including a sound generator being positioned in said interior space of said housing, said sound generator generating sound signals when said sound generator is turned on, said sound signals including animal sounds corresponding to an animal represented by said head, said sound generation assembly includes a sensor switch being in electrical communication with said sound generator, said sensor switch being in fluid communication with said interior space to detect changes in air flow characteristics in said interior space, said sensor switch turning said sound generator on when said sensor switch detects an increase in air flow characteristics in said air passage indicative of said housing being blown into, said sensor switch turning said sound generator off when said sensor switch senses a lack of air flow characteristics in said air passage indicative of a lack of air flow in said air passage.

9. The whistle according to claim 8, wherein said front portion has a front aperture therein being positioned adjacent a nose of the head of the animal.

10. The whistle according to claim 9, wherein said peripheral wall includes a rear portion being substantially frusto-conical shaped and extending away from said front portion, said peripheral wall having a rear aperture therein positioned in a free end of said rear portion positioned opposite said front portion, wherein said rear aperture allows air to be blown into said interior space and said front aperture allows air blown into said interior space to exit said interior space.

11. The whistle according to claim 10, wherein said housing includes a divider wall being coupled to said peripheral wall and positioned in said interior space, said divider wall dividing said interior space into an air passage and a component space, said air passage being in fluid communication with said rear aperture and said front aperture, a portion of said sound generation assembly being positioned in said component space.

12. The whistle according to claim 8, wherein said sound generation assembly includes a power supply being positioned in said interior space and being in electrical communication with said sound generator, said power supply supplying power to said sound generator.

13. The whistle according to claim 8, wherein said sound generation assembly includes a sound emitter being positioned in said interior space, said sound emitter being in electrical communication with said sound generator and receiving the sound signals from said sound emitter, said sound emitter generating audible tones characteristic of the animal sounds from the sound signals, said sound emitter being directed toward said front portion, said front portion having a plurality of openings therein positioned adjacent to said sound emitter.

14. The whistle according to claim 8, further comprising a lanyard being coupled to said housing and forming a loop, said lanyard being positionable around a portion of a person's neck to allow said housing to be suspended from the neck.

* * * * *